(12) United States Patent
Sedler et al.

(10) Patent No.: US 12,164,566 B2
(45) Date of Patent: Dec. 10, 2024

(54) GRAPH WORKSPACE FOR HETEROGENEOUS GRAPH DATA

(71) Applicant: SAP SE, Walldorf (DE)

(72) Inventors: Roland Sedler, Dossenheim (DE);
Gerald Franz, Walldorf (DE);
Matthias Hauck, Frankfurt (DE);
Hannes Jakschitsch, Mannheim (DE)

(73) Assignee: SAP SE, Walldorf (DE)

( * ) Notice: Subject to any disclaimer, the term of this patent is extended or adjusted under 35 U.S.C. 154(b) by 23 days.

(21) Appl. No.: 17/847,833

(22) Filed: Jun. 23, 2022

(65) Prior Publication Data
US 2023/0418869 A1    Dec. 28, 2023

(51) Int. Cl.
*G06F 16/901* (2019.01)
*G06F 16/22* (2019.01)
*G06F 16/242* (2019.01)

(52) U.S. Cl.
CPC ...... *G06F 16/9024* (2019.01); *G06F 16/2282* (2019.01); *G06F 16/2445* (2019.01)

(58) Field of Classification Search
CPC .............. G06F 16/9024; G06F 16/2282; G06F 16/2445
See application file for complete search history.

(56) References Cited

U.S. PATENT DOCUMENTS

| | | | |
|---|---|---|---|
| 9,600,269 B1* | 3/2017 | Bregler | G06F 8/60 |
| 10,409,782 B2* | 9/2019 | Zhang | G06F 16/9024 |
| 11,093,459 B2* | 8/2021 | Arnaboldi | G06F 16/27 |
| 11,442,988 B2* | 9/2022 | Sequeda | G06F 16/212 |
| 11,500,868 B2* | 11/2022 | Segalini | G06F 16/24526 |
| 11,507,579 B2* | 11/2022 | Haprian | G06F 16/24526 |
| 2017/0147311 A1* | 5/2017 | Bregler | G06F 16/212 |
| 2019/0286662 A1* | 9/2019 | Yousfi | G06F 16/90335 |
| 2020/0265090 A1* | 8/2020 | Hilloulin | G06F 16/9024 |
| 2022/0114178 A1* | 4/2022 | Haprian | G06F 16/24539 |
| 2022/0245147 A1* | 8/2022 | Segalini | G06F 16/24552 |

* cited by examiner

*Primary Examiner* — Miranda Le
(74) *Attorney, Agent, or Firm* — Mintz Levin Cohn Ferris Glovsky and Popeo, P.C.

(57) ABSTRACT

A method may include receiving a workspace definition defining a graph workspace for a heterogeneous graph having a plurality of vertex tables and/or edge tables. Upon validating the workspace definition, the graph workspace for the heterogeneous graph may be created in accordance with the workspace definition. The graph workspace may include a label for each table of the plurality of vertex tables and/or edge tables comprising the heterogeneous graph. Each vertex and edge of the heterogeneous graph may be uniquely identified based on a label of a corresponding table and one or more key attributes. A graph processing algorithm operating on the heterogeneous graph may be executed based on the graph workspace. Related systems and computer program products are also provided.

18 Claims, 6 Drawing Sheets

Vertex Table 310

| FirstName | LastName |
|---|---|
| I123456 Taehyung | Kim |
| D123456 Maria | Peters |

Vertex Table 320

| ProjNum | Budget |
|---|---|
| 1 | 1000000 |
| 2 | 750000 |

Vertex Table 330

| ID | Price |
|---|---|
| 1 | 1000 |
| 2 | 500 |

Vertex Table 340

| Company | Address |
|---|---|
| XYZ Corp | Address1 |
| ABC Inc | Address2 |

350 →

| V_ID | FirstName | LastName | ProjNum | Budget | ProductID | Price | Company | Address |
|---|---|---|---|---|---|---|---|---|
| 1 | I123456 | Kim | NULL | NULL | NULL | NULL | NULL | NULL |
| 2 | D123456 | Peters | NULL | NULL | NULL | NULL | NULL | NULL |
| 3 | NULL | NULL | 1 | 1000000 | NULL | NULL | NULL | NULL |
| 4 | NULL | NULL | 2 | 750000 | NULL | NULL | NULL | NULL |
| 5 | NULL | NULL | NULL | NULL | 1 | 1000 | NULL | NULL |
| 6 | NULL | NULL | NULL | NULL | 2 | 500 | NULL | NULL |
| 7 | NULL | NULL | NULL | NULL | NULL | NULL | XYZ Corp | Address1 |
| 8 | NULL | NULL | NULL | NULL | NULL | NULL | ABC Inc. | Address2 |

↑ New key column

GRAPH WORKSPACE FOR HETEROGENEOUS GRAPH DATA

TECHNICAL FIELD

The subject matter described herein relates generally to database processing and more specifically to a graph workspace for supporting heterogeneous graph data having multiple vertex tables and/or edge tables.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items. Contrastingly, a relational database may store the relationships between different data items implicitly, for example, by organizing the data items into one or more database tables and encoding their relations via foreign key values. A relational database may be configured to store graph data, for example, by storing the vertices of a graph in a vertex table and the edges of the graph in a separate edge table.

SUMMARY

Systems, methods, and articles of manufacture, including computer program products, are provided for a graph workspace supporting heterogeneous graphs. In one aspect, there is provided a system including at least one data processor and at least one memory. The at least one memory may store instructions that cause operations when executed by the at least one data processor. The operations may include: receiving a workspace definition defining a graph workspace for a heterogeneous graph having a plurality of vertex tables and/or edge tables; upon validating the workspace definition, creating the graph workspace for the heterogeneous graph in accordance with the workspace definition, the graph workspace including a label for each table of the plurality of vertex tables and/or edge tables comprising the heterogeneous graph, and each vertex and edge of the heterogeneous graph being uniquely identified based on a label of a corresponding table and one or more key attributes; and executing, based at least on the graph workspace, a graph processing algorithm operating on the heterogeneous graph.

In another aspect, there is provided a method for a graph workspace supporting heterogeneous graphs. The method may include: receiving a workspace definition defining a graph workspace for a heterogeneous graph having a plurality of vertex tables and/or edge tables; upon validating the workspace definition, creating the graph workspace for the heterogeneous graph in accordance with the workspace definition, the graph workspace including a label for each table of the plurality of vertex tables and/or edge tables comprising the heterogeneous graph, and each vertex and edge of the heterogeneous graph being uniquely identified based on a label of a corresponding table and one or more key attributes; and executing, based at least on the graph workspace, a graph processing algorithm operating on the heterogeneous graph.

In another aspect, there is provided a computer program product including a non-transitory computer readable medium storing instructions. The instructions may cause operations may executed by at least one data processor. The operations may include: receiving a workspace definition defining a graph workspace for a heterogeneous graph having a plurality of vertex tables and/or edge tables; upon validating the workspace definition, creating the graph workspace for the heterogeneous graph in accordance with the workspace definition, the graph workspace including a label for each table of the plurality of vertex tables and/or edge tables comprising the heterogeneous graph, and each vertex and edge of the heterogeneous graph being uniquely identified based on a label of a corresponding table and one or more key attributes; and executing, based at least on the graph workspace, a graph processing algorithm operating on the heterogeneous graph.

In some variations of the methods, systems, and non-transitory computer readable media, one or more of the following features can optionally be included in any feasible combination. The workspace definition may be validated to determine whether the workspace definition satisfy one or more conditions.

In some variations, the one or more conditions may include a verification that vertex attributes defined to have a same name share a same datatype across different vertex tables, and wherein the one or more conditions further include a verification that edge attributes defined to have a same name share a same datatype across different edge tables.

In some variations, the one or more conditions may include a verification that the workspace definition defines, for an edge table including a plurality of source vertices and a plurality of destination vertices, a first vertex table including the plurality of source vertices and a second vertex table including the plurality of destination vertices.

In some variations, the first vertex table and the second vertex table may be a same table or different tables within the heterogeneous graph.

In some variations, the one or more conditions may include a verification that the label associated with each table of the plurality of vertex tables and/or edge tables are unique within the graph workspace.

In some variations, the one or more conditions may include a verification that a creator of the graph workspace has a CREATE ANY privilege for the graph workspace and a SELECT privilege for the plurality of vertex tables and/or edge tables.

In some variations, the label for each table of the plurality of vertex tables and/or edge tables may be explicitly defined or defaults to a corresponding table name.

In some variations, the heterogeneous graph may include a first vertex table including a first plurality of vertices representative of a first plurality of entities, a second vertex table including a second plurality of vertices representative of a second plurality of entities, and at least one edge table including a plurality of edges representative of a plurality of relationships amongst the first plurality of entities and/or the second plurality of entities.

In some variations, the graph processing algorithm may include one or more graph processing functions including subgraph, inverse graph, in-degree, out-degree, incoming edges, outgoing edges, neighbors, is-reachable, shortest path, shortest path one to all, k shortest paths, strongly connected components, depth first traversal, and breadth first traversal.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a graph workspace supporting heterogeneous graphs having multiple vertex tables and/or edge tables, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Graph data may provide a power mechanism for modeling various types of interconnected data and/or data exhibiting network-like relationships. As noted, a relational database may store graph data, for example, by storing the vertices of a graph in a vertex table and the edges of the graph in an edge table. Moreover, the relational database may provide native support of various graph algorithms (e.g., shortest path, minimum flow, page rank, and/or the like) operating on the graph-modeled data such that graph algorithms can be performed within the relational database instead of by an external application or processing engine (e.g., a graph management system (GMS)). In some cases, the relational database may store a graph in a graph workspace, which is a catalog object that defines the graph in terms of the underlying vertex and edge tables.

A conventional graph workspace is configured to support homogenous or uniform typed graphs having a single vertex table and a single edge table. That is, a conventional graph workspace is capable of modeling a graph whose vertices are of the same type (e.g., by sharing the same attributes) and whose edges also of the same type (e.g., by sharing the same attributes). A heterogeneous graph is a graph whose vertices and edges are not of the same type. For example, a heterogeneous graph may have at least some vertices and/or edges with different attributes with different names, different datatypes, and/or the like. As such, instead of a single vertex table and a single edge table, a heterogeneous graph may be associated with multiple vertex tables and/or edge tables. The conventional solution for modeling a heterogeneous graph in a conventional graph workspace is to create a single global vertex table that is a union of multiple vertex tables and/or a single global edge table that is a union of multiple edge tables. The global vertex table and the global edge table may include null entries for non-common attributes. Moreover, the global vertex table and the global edge table may include a unique key for each record in the global vertex table while the global edge table may include a unique key for each record in the global edge table.

However, modeling heterogeneous graph in the foregoing manner can be cumbersome. For example, operating on a heterogeneous graph modeled as a single vertex table and a single edge table may consume excessive time and computational resources due an increase data volume and memory consumption. Moreover, modeling a heterogeneous graph as a single vertex table and a single edge table may not be entirely compatible with common graph query languages such as GraphScript but may require extra tracking to identify the actual attributes of each vertex and edge in the heterogeneous graph. Accordingly, in some example embodiments, a graph processing engine may be configured to implement heterogeneous graph workspaces capable of supporting a heterogeneous graph having multiple vertex tables and/or multiple edge tables. Instead of the global vertex table and the global edge table of a conventional graph workspace, the heterogeneous graph workspace may maintain separate vertex tables and edge tables. Individual vertices and edges of a heterogeneous graph may be uniquely identified by a label and one or more attributes denoted as key attributes.

Figure 1:
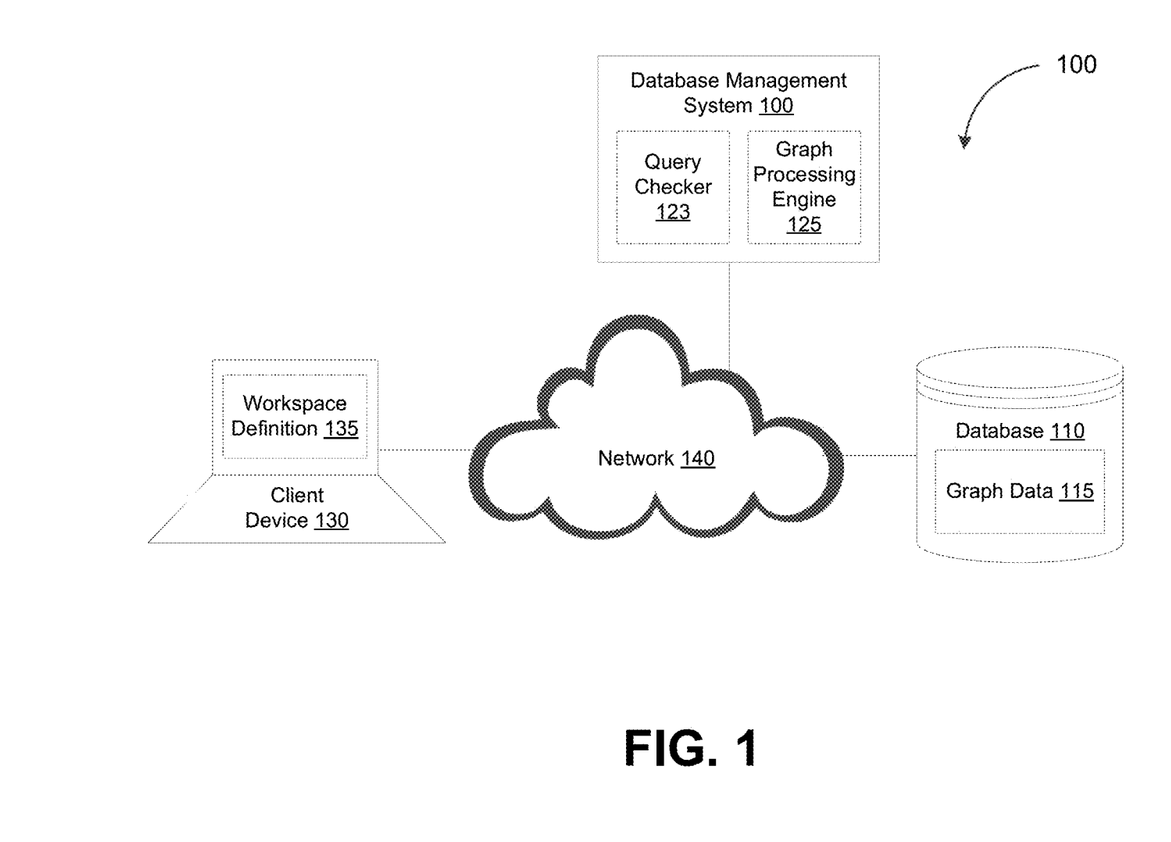
FIG. 1 depicts a system diagram illustrating an example of a graph data processing system, in accordance with some example embodiments.

FIG. 1 depicts an example of a graph data processing system 100, in accordance with some example embodiments. Referring to FIG. 1, the graph data processing system 110 may include a database 110 storing a graph data 115, a database management system 120 including a query checker 123 and a graph processing engine 125, and a client device 130. The graph database 110, the database management system 120, and the client device 130 may be communicatively coupled via a network 140. In some example embodiments, the database 110 may be a relational database configured to store the graph data 115. However, it should be appreciated that the database 110 may be any type of database including, for example, an in-memory database, a hierarchical database, an object database, an object-relational database, a non-Structured Query Language (NoSQL) database, and/or the like. For example, instead of and/or in addition to being a relational database, the database 115 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 110 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a smartphone, a tablet computer, a wearable apparatus, a virtual assistant, an Internet-of-Things (IoT) appliance, and/or the like.

Figure 2:
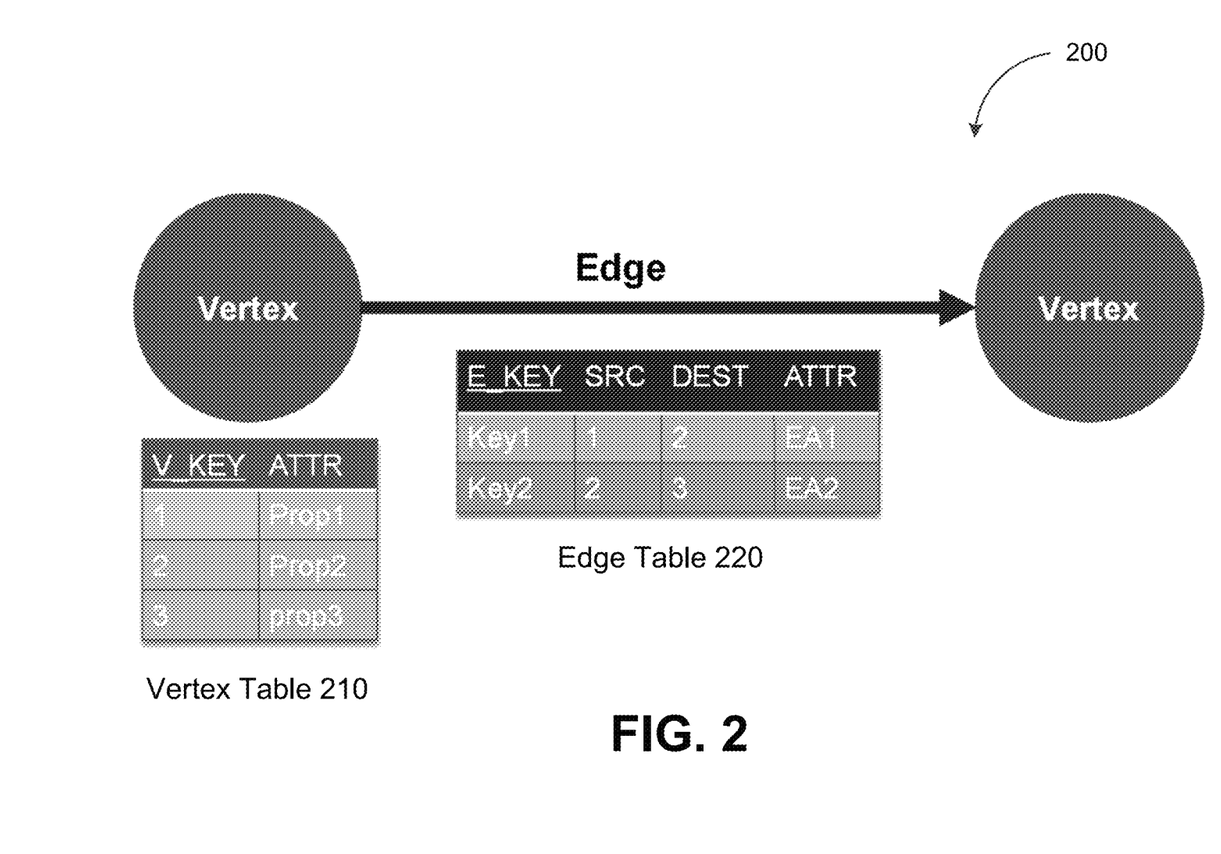
FIG. 2 depicts a schematic diagram illustrating an example of a graph workspace for a homogeneous graph, in accordance with some example embodiments.

The client device 130 may send, to the database management system 110, a request to execute a graph processing algorithm that derives a solution by operating on the graph data 115 stored in the database 110. In some cases, the graph data 115 may correspond to a homogenous or uniform typed graph having a single vertex table and a single edge table. FIG. 2 depicts a schematic diagram illustrating an example of a graph workspace 200 for a homogeneous or uniformed typed graph, in accordance with some example embodiments. The vertices and the edges of a homogeneous or uniformed typed graph may share the same attributes and are thus of the same type. Accordingly, as shown in FIG. 2, the graph workspace 200 for the homogenous graph may include a single vertex table 210 containing the vertices of the homogenous graph and an edge table 220 containing the edges of the homogenous graph. Moreover, as shown in FIG. 2, the edge table 220 may include, for each edge of the homogenous graph, a source vertex and a destination vertex interconnected by the edge. For example, each vertex in the vertex table 210 may be representative of an entity while each edge in the edge table 220 may be representative of a relationship between the entities corresponding to the vertices interconnected by the edge.

Figure 3A:
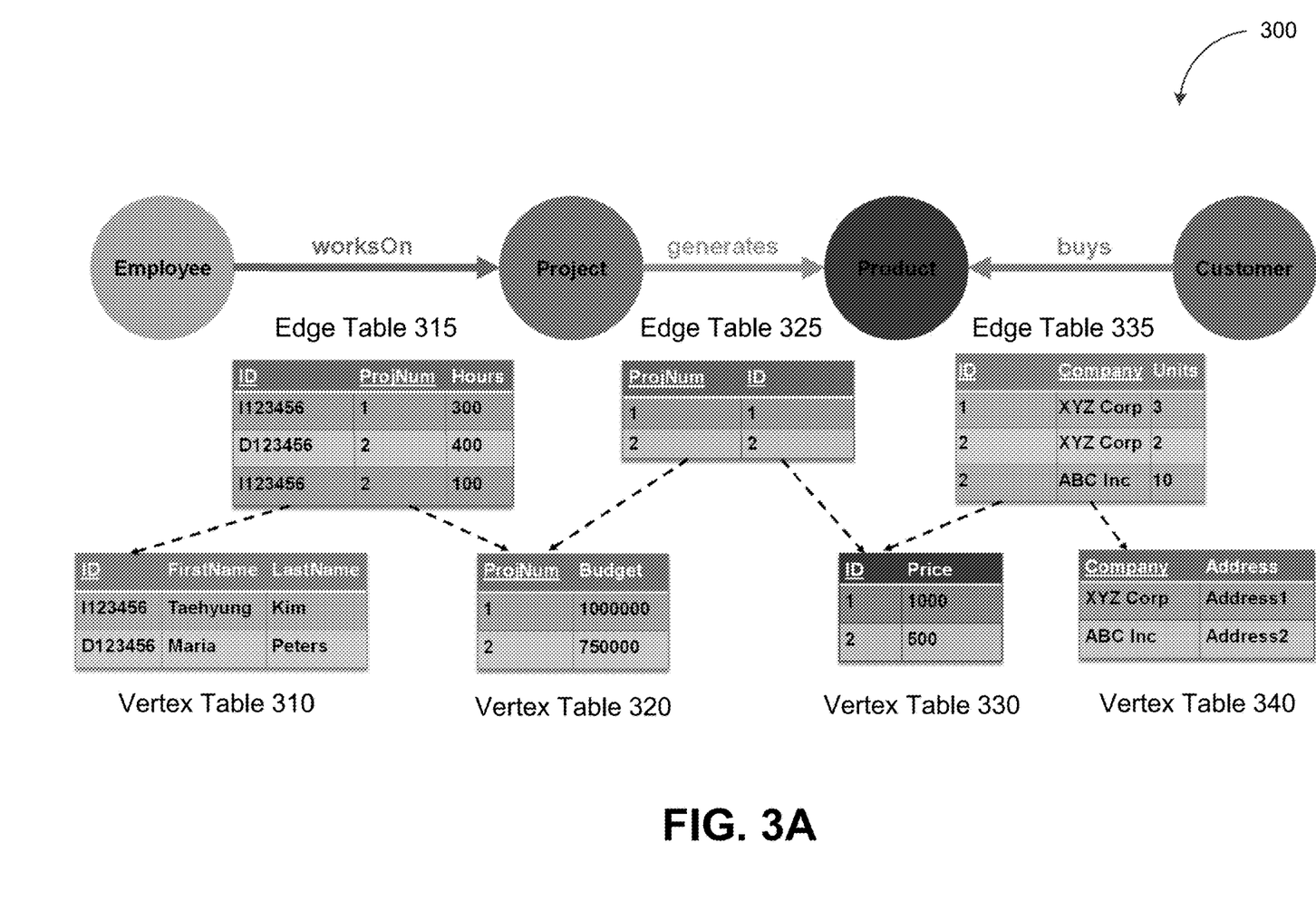
FIG. 3A depicts an example of a heterogeneous graph, in accordance with some example embodiments.

Alternatively and/or additionally, the graph data 115 may correspond to a heterogeneous graph having at least some vertices and/or edges with different attributes with different names, different datatypes, and/or the like. FIG. 3A depicts an example of a heterogeneous graph 300, in accordance with some example embodiments. For example, as shown in FIG. 3A, the heterogeneous graph 300 may include multiple vertex tables such as a first vertex table 310 in which each vertex is representative of an employee, a second vertex table 320 in which each vertex is representative of a project, a third vertex table 330 in which each vertex is representative of a product, and a fourth vertex table 340 in which each vertex is representative of a customer. Moreover, FIG. 3A shows that the vertices included in the first vertex table 310, the second vertex table 320, the third vertex table 330, and the fourth vertex table 340 may be associated with different attributes with different names, different datatypes, and/or the like. For instance, the vertices included in the first vertex table 310 may be associated with the attributes "ID," "FirstName," and "LastName," which differ from the attributes "ProjNum" and "Budget" associated with the vertices included in the second vertex table 320.

Referring again to FIG. 3A, the heterogeneous graph 300 may also include multiple edge tables such as a first edge table 315 storing edges that interconnect vertices from the first vertex table 310 and the second vertex table 320, a second edge table 325 storing edges that interconnect vertices from the second vertex table 320 and the third vertex table 330, and a third edge table 335 storing edges that interconnect vertices from the third vertex table 340. For example, as shown in FIG. 3A, the edges included in the first edge table 315 may be representative of the relationship "works on" between the vertices that represent employees from the first vertex table 310 and the vertices that represent projects from the second vertex table 320. Meanwhile, the edges included in the second edge table 325 may be representative of the relationship "generates" between the vertices that represent projects from the second vertex table 320 and the vertices that represent products from the third vertex table 330. As shown in FIG. 3A, the edges included in the first edge table 315, the second edge table 325, and the third edge table 335 do not share the same attributes. Instead, for example, the edges included in the first edge table 315 are associated with the attributes "ID," "ProjNum," and "Hours" whereas the edges included in the second edge table 325 are associated with the attributes "ProjNum" and "ID."

Figure 3B:
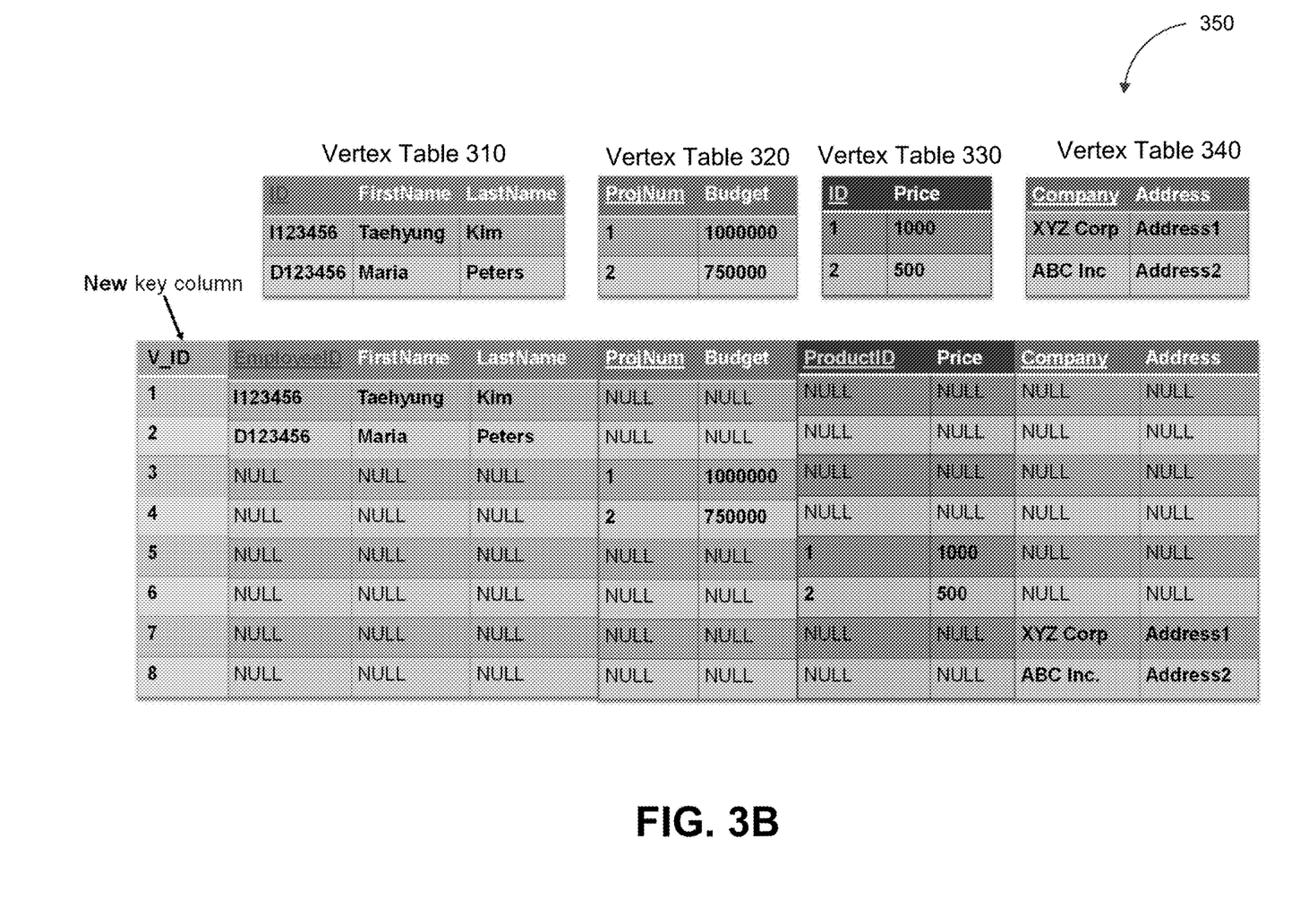
FIG. 3B depicts an example of a global vertex table representative of a heterogeneous graph, in accordance with some example embodiments.

The conventional solution for modeling a heterogeneous graph in a conventional graph workspace is to create a single global vertex table that is a union of multiple vertex tables and/or a single global edge table that is a union of multiple edge tables. To further illustrate, FIG. 3B depicts an example of a global vertex table 350 representative of the heterogeneous graph 300. As shown in FIG. 3B, the global vertex table 350 may be a union of the first vertex table 310, the second vertex table 320, the third vertex table 330, and the fourth vertex table 340. In order to reconcile the differences between the attributes of the vertices included in the first vertex table 310, the second vertex table 320, the third vertex table 330, and the fourth vertex table 340, the global edge table 350 may include null entries for non-common attributes. Moreover, FIG. 3B shows that the global vertex table 350 may include a unique key (e.g., a new key column "V_ID") for each record in the global vertex table 350.

Modeling the heterogeneous graph 300 in the foregoing manner can be cumbersome. For example, operating on the heterogeneous graph 300 modeled as the global vertex table 350 and a corresponding global edge table may consume excessive time and computational resources due an increase data volume and memory consumption. Moreover, modeling the heterogeneous graph 300 as the global vertex table 350 and the corresponding global edge table may not be entirely compatible with common graph query languages such as GraphScript but may require extra tracking to identify the actual attributes of each vertex and edge in the heterogeneous graph 300. Accordingly, in some example embodiments, the graph processing engine 125 may be configured to implement heterogeneous graph workspaces capable of supporting the heterogeneous graph 300 without the aforementioned global vertex table and the global edge table of a conventional graph workspace. Instead, the heterogeneous graph workspace may model the heterogeneous graph 300 by maintaining each of the first vertex table 310, the second vertex table 320, the third vertex table 330, and the fourth vertex table 340 separately. Likewise, the heterogeneous graph workspace may model the heterogeneous graph 300 by maintaining each of the first edge table 315, the second edge table 325, and the third edge table 335 separately. Individual vertices and edges of the heterogeneous graph 300 may be uniquely identified by a label and one or more attributes denoted as key attributes.

Table 1 below depicts SQL grammar and parser extensions for supporting heterogeneous graph workspaces. As shown in Table 1, a heterogeneous graph workspace for the heterogeneous graph 300 may be defined by defining each of its constituent vertex tables (e.g., the first vertex table 310, the second vertex table 320, the third vertex table 330, and the fourth vertex table 340) and edge tables (e.g., the first edge table 315, the second edge table 325, and the third edge table 335). That is, in some example embodiments, the heterogeneous graph workspace may be capable of supporting multiple vertex tables as well as multiple edge tables. Within this paradigm, vertex attributes defined to have the same name may be required to share the same datatype as well across different vertex tables. Likewise, edge attributes defined to have the name may be required to also share the same datatype across different edge tables.

between the vertices that represent employees from the first vertex table 310 and the vertices that represent projects from the second vertex table 320. Meanwhile, the edges included in the second edge table 325 may be representative of the relationship "generates" between the vertices that represent projects from the second vertex table 320 and the vertices that represent products from the third vertex table 330. It should be appreciated that when defining the edge tables of the heterogeneous graph 300, which stores edges interconnecting individual pairs of source vertices and destination vertices, the source vertices and destination vertices included in each individual edge table may refer to vertices from the same vertex tables. For example, as shown in FIG. 3A, the source vertices "ID" in the first edge table 315 of the heterogeneous graph 300 are from the first vertex table 310 while the target vertices "ProjNum" in the first edge table 315 of the heterogeneous graph 300 are from the second vertex table 320.

When defining the heterogeneous graph workspace of the heterogeneous graph 300, which includes multiple vertex tables, it may be mandatory to specify the vertex table referenced by the source vertices and target vertices of each edge table. Moreover, the datatype and order of the source

TABLE 1

```
CREATE GRAPH WORKSPACE <workspace_name> <graph_tables> [<cache_options>]
° Graph workspace name specification
    <workspace_name> ::= [<schema_name>.]<identifier>
° Vertex and edge tables specification
    <graph_tables> ::= {<vertex_table> | <edge_table>} [. . .]
    ° A valid graph workspace must contain at least one vertex and one edge table.
    ° Multiple vertex and edge tables can be specified in any order.
° Vertex table specification
    <vertex_table> = VERTEX TABLE <table_name> <key_columns> [<label_specification>]
° Edge table specification
    <edge_table> = EDGE TABLE <table_name> <source_columns> <target_columns>
        <key_columns> [<label_specification>]
° Key columns specification
    <key_columns> ::= KEY COLUMN <column_name_list>
    <column_name_list> ::= <column_name> [ { , <column_name> } [. . .] ]
    <column_name> ::= <identifier>
° Label specification
    <label_specification> ::= LABEL <string_literal>
° Edge source and target columns specifications
    <source_columns> ::= SOURCE COLUMN <column_name_list>
    [<vertex_table_references>]
    <target_columns> ::= TARGET COLUMN <column_name_list>
    [<vertex_table_reference>]
    <vertex_table_references> ::= REFERENCES <table_name>
```

In some example embodiments, when defining the heterogeneous graph workspace of the heterogeneous graph 300, one or more of the vertex tables and/or edge tables associated with the heterogeneous graph 300 may be associated with an optional label. In the event the definition of the heterogeneous graph workspace does not specify a label for a particular edge table or vertex table of the heterogeneous graph 300, the label defaults to the corresponding table name. Moreover, when defining the heterogeneous graph workspace of the heterogeneous graph 300, the labels assigned to the vertices and edges must be unique within the graph workspace. Accordingly, when operating on the heterogeneous graph 300, each vertex and edge within the heterogeneous graph 300 may be uniquely identifiable by the corresponding label and one or more attributes denoted as key attributes.

As noted, in the example of the heterogeneous graph 300 shown in FIG. 3A, the edges included in the first edge table 315 may be representative of the relationship "works on"

vertex attributes and target vertex attributes may be required to match the datatype and order of the key attributes in the corresponding vertex tables.

Table 2 below depicts an example of a workspace definition 135, which includes one or more SQL statement creating a heterogeneous graph workspace representative of the heterogeneous graph 300.

TABLE 2

```
CREATE GRAPH WORKSPACE MY_SCHEMA.COMPANY_GRAPH
    VERTEX TABLE EMPLOYEES
        KEY COLUMN ID
        LABEL 'Employee'
    VERTEX TABLE PROJECTS
        KEY COLUMN PROJNUM
        LABEL 'Project'
    EDGE TABLE PROJECT_ASSIGNMENTS
        SOURCE COLUMN ID REFERENCES EMPLOYEES
        TARGET COLUMN PROJNUM REFERENCES PROJECTS
```

TABLE 2-continued

```
    KEY COLUMN ID, PROJNUM
    LABEL 'Assignments'
EDGE TABLE PROJECT_OUTCOMES
    SOURCE COLUMN PROJNUM REFERENCES PROJECTS
    TARGET COLUMN ID REFERENCES PRODUCTS
    KEY COLUMN PROJNUM, ID
VERTEX TABLE PRODUCTS
    KEY COLUMN ID
    LABEL 'Product'
VERTEX TABLE CUSTOMERS
    KEY COLUMN COMPANY
EDGE TABLE SALES
    SOURCE COLUMN ID REFERENCES PRODUCTS
    TARGET COLUMN COMPANY REFERENCES CUSTOMERS
    KEY COLUMN ID, COMPANY
    LABEL 'Sales';
```

In some example embodiments, the query checker 123 of the database management system 120 may also be configured to support heterogeneous graph workspaces such as the heterogeneous graph workspace associated with the example of the heterogeneous graph 300 shown in FIGS. 3A-B. For example, the query checker 123 may be configured to validate the workspace definition 135 received from the client device 130 including by determining whether the workspace definition 135 satisfies one or more conditions. In some cases, the workspace definition 135 may include one or more SQL statements defining the heterogeneous graph workspace of the heterogeneous graph 300. Accordingly, in some cases, the query checker 123 may validate the workspace definition 135 by at least verifying that vertex attributes defined to have the same name share the same datatype (e.g., across different vertex tables) and that edge attributes defined to have the name also share the same datatype (e.g., across different edge tables).

In cases where multiple vertex tables are defined, such as the case for the example of the heterogeneous graph 300 shown in FIGS. 3A-B, the query checker 123 may verify that for each edge table, the vertex tables referenced by the source vertices and destination vertices are specified in the workspace definition 135. The query checker 123 may also verify that the labels associated with the vertices and edges, whether explicitly or implicitly defined, are unique within the graph workspace of the heterogeneous graph 300. In some cases, the query checker 123 may further verify that the creator of the graph workspace has a CREATE ANY privilege for the intended graph workspace schema and a SELECT privilege for all the graph tables. A successfully created graph workspace may remain valid as long as the aforementioned conditions are fulfilled. However, a revalidation of the graph workspace may be triggered (e.g., a reverification of one or more of the aforementioned conditions) when one or more of the vertex tables and/or edge tables associated with the graph workspace are altered for example, by the addition and/or removal of a column.

In some example embodiments, the heterogeneous graph workspace associated with the heterogeneous graph 300 may a catalog object of the database 110 that defines the heterogeneous graph 300 in terms of its multiple underlying vertex tables and edge tables. Accordingly, to support the heterogeneous graph 300, the metadata of the corresponding graph workspace object may be extended to accommodate multiple vertex tables, which includes an explicitly defined label for each vertex table. When a label is not explicitly defined for a vertex table, the vertex table may be assigned a default label (e.g., the name of the table, a number assigned to the table, and/or the like) that is unique within the heterogeneous graph workspace. Moreover, the metadata of the graph workspace object may be extended to accommodate multiple edge tables. In addition, for each edge table that defines a relationship between individual pairs of source vertices and destination vertices, the metadata of the graph workspace object may be extended to accommodate the vertex table storing the source vertices, the vertex table storing the destination vertices, and the optional label for each vertex table (NULL if no label is explicitly defined).

Figure 4:
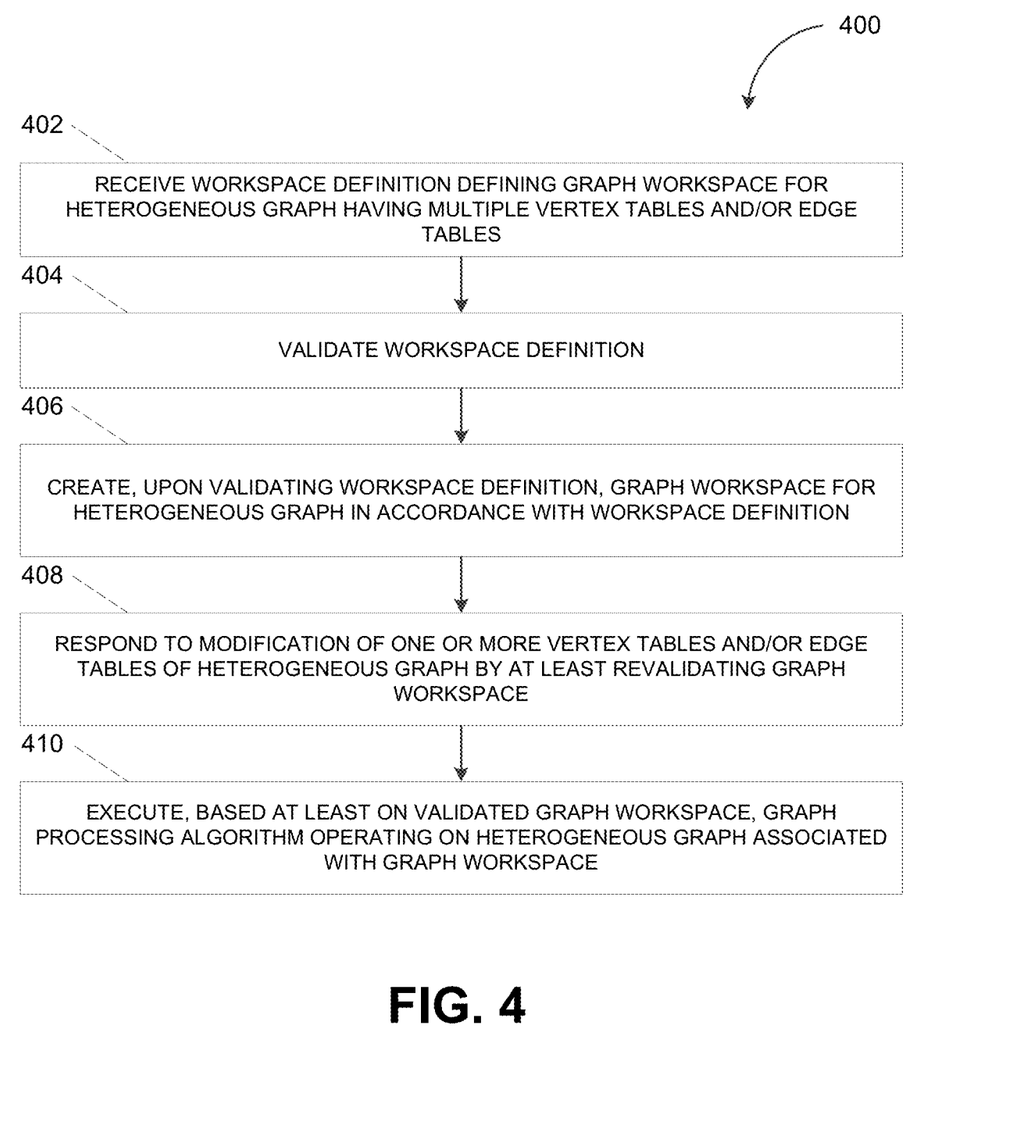
FIG. 4 depicts a flowchart illustrating an example of a process for a graph workspace supporting heterogeneous graphs, in accordance with some example embodiments.

FIG. 4 depicts a flowchart illustrating an example of a process 400 for a graph workspace supporting heterogeneous graphs, in accordance with some example embodiments. Referring to FIGS. 1-4, the process 400 may be performed by the database management system 120, for example, the query checker 123 and the graph processing engine 125, to support operations on a heterogeneous graph having multiple vertex table and/or edge tables such as the example of the heterogeneous graph 300 shown in FIGS. 3A-B.

At 402, the database management system 120 may receive a workspace definition defining a graph workspace for a heterogeneous graph having multiple vertex tables and/or edge tables. For example, the database management system 120 may receive, from the client device 130, the workspace definition 135. As shown in Table 2, the workspace definition 135 may include one or more SQL statements for creating a heterogeneous graph workspace representative of the heterogeneous graph 300.

At 404, the database management system 120 may validate the workspace definition. In some example embodiments, the query checker 123 may be configured to validate the workspace definition 135 received from the client device 130 including by determining whether the workspace definition 135 satisfies one or more conditions. One example condition required for validating the workspace definition 135 includes a verification that the vertex attributes defined to have the same name share the same datatype across different vertex tables and that edge attributes defined to have the name also share the same datatype across different edge tables. This condition ensures that queries on the heterogeneous graph workspace is able to rely on the datatype provided by the heterogeneous graph workspace. In cases where vertex and edge attributes with the same name are not required to have the same datatype, queries on the graph workspace cannot rely on the type information received from the graph workspace object. Instead, datatype information is inferred from the usage context (e.g. the attribute value could be assigned to a known type or be directly casted after usage) but where the datatype & attribute name pair is not supported by a particular vertex or edge, the backend may resort to default behavior and return a NULL.

Another example condition is applicable in cases where multiple vertex tables are defined, such as the case for the example of the heterogeneous graph 300 shown in FIGS. 3A-B. In such cases, the query checker 123 may verify that for each edge table, the vertex tables referenced by the source vertices and destination vertices are specified in the workspace definition 135. Yet another condition that the query checker 123 verifies is that the labels associated with the vertices and edges, whether explicitly or implicitly defined, are unique within the graph workspace of the heterogeneous graph 300. In some cases, the query checker 123 may further verify that the creator of the graph workspace has a CREATE ANY privilege for the intended graph workspace schema and a SELECT privilege for all the graph tables.

At 406, the database management system 120 may create, upon validating the workspace definition, the graph workspace for the heterogeneous graph in accordance with the workspace definition. When the workspace definition 135 is successfully validated by the query checker 123, the corresponding graph workspace for the heterogeneous graph 300 may be created at the database 110 as a catalog object.

At 408, the database management system 120 may respond to a modification of one or more vertex tables and/or an edge tables of the heterogeneous graph by at least revalidating the graph workspace. The graph workspace of the heterogeneous graph 300 may remain valid as long as the validation conditions described above are fulfilled. However, a revalidation of the graph workspace may be triggered (e.g., a reverification of one or more of the aforementioned conditions) when one or more of the vertex tables and/or edge tables associated with the graph workspace are altered. For example, subsequent to creating the graph workspace of the heterogeneous graph 300 upon successfully validating the workspace definition 135, the query checker 123 may revalidate one or more of the aforementioned conditions whenever a column is added and/or removed from one or more of the first vertex table 310, the second vertex table 320, the third vertex table 330, the fourth vertex table 340, the first edge table 315, the second edge table 325, and/or the third edge table 335 of the heterogeneous graph 300.

At 410, the database management system 120 may execute, based at least on the validated graph workspace, a graph processing algorithm operating on the heterogeneous graph associated with the graph workspace. For example, the graph processing engine 125 may receive, from the client device 130, a graph processing algorithm that includes one or more graph processing functions including, for example, subgraph, inverse graph, in-degree, out-degree, incoming edges, outgoing edges, neighbors, is-reachable, shortest path, shortest path one to all, k shortest paths, strongly connected components, depth first traversal, breadth first traversal, and/or the like. The graph processing algorithm may operate on the heterogeneous graph 300, which may be stored in the database 110 as a part of the corresponding heterogeneous graph workspace. Accordingly, the graph processing engine 125 may execute the graph processing algorithm based at least on the graph workspace associated with the heterogeneous graph 300.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a workspace definition defining a graph workspace for a heterogeneous graph having a plurality of vertex tables and/or edge tables; upon validating the workspace definition, creating the graph workspace for the heterogeneous graph in accordance with the workspace definition, the graph workspace including a label for each table of the plurality of vertex tables and/or edge tables comprising the heterogeneous graph, and each vertex and edge of the heterogeneous graph being uniquely identified based on a label of a corresponding table and one or more key attributes; and executing, based at least on the graph workspace, a graph processing algorithm operating on the heterogeneous graph.

Example 2: The system of Example 1, wherein the operations further comprise: validating the workspace definition to determine whether the workspace definition satisfy one or more conditions.

Example 3: The system of Example 2, wherein the one or more conditions include a verification that vertex attributes defined to have a same name share a same datatype across different vertex tables, and wherein the one or more conditions further include a verification that edge attributes defined to have a same name share a same datatype across different edge tables.

Example 4: The system of any one of Examples 2 to 3, wherein the one or more conditions includes a verification that the workspace definition defines, for an edge table including a plurality of source vertices and a plurality of destination vertices, a first vertex table including the plurality of source vertices and a second vertex table including the plurality of destination vertices.

Example 5: The system of Example 4, wherein the first vertex table and the second vertex table are a same table or different tables within the heterogeneous graph.

Example 6: The system of any one of Examples 2 to 5, wherein the one or more conditions include a verification that the label associated with each table of the plurality of vertex tables and/or edge tables are unique within the graph workspace.

Example 7: The system of any one of Examples 2 to 6, wherein the one or more conditions include a verification that a creator of the graph workspace has a CREATE ANY privilege for the graph workspace and a SELECT privilege for the plurality of vertex tables and/or edge tables.

Example 8: The system of any one of Examples 1 to 7, wherein the label for each table of the plurality of vertex tables and/or edge tables is explicitly defined or defaults to a corresponding table name.

Example 9: The system of any one of Examples 1 to 8, wherein the heterogeneous graph includes a first vertex table including a first plurality of vertices representative of a first plurality of entities, a second vertex table including a second plurality of vertices representative of a second plurality of entities, and at least one edge table including a plurality of edges representative of a plurality of relationships amongst the first plurality of entities and/or the second plurality of entities.

Example 10: The system of any one of Examples 1 to 9, wherein the graph processing algorithm includes one or more graph processing functions including subgraph, inverse graph, in-degree, out-degree, incoming edges, outgoing edges, neighbors, is-reachable, shortest path, shortest path one to all, k shortest paths, strongly connected components, depth first traversal, and breadth first traversal.

Example 11: A computer-implemented method, comprising: receiving a workspace definition defining a graph workspace for a heterogeneous graph having a plurality of vertex tables and/or edge tables; upon validating the workspace definition, creating the graph workspace for the heterogeneous graph in accordance with the workspace definition, the graph workspace including a label for each table of the plurality of vertex tables and/or edge tables comprising the heterogeneous graph, and each vertex and edge of the heterogeneous graph being uniquely identified based on a label of a corresponding table and one or more key attributes; and executing, based at least on the graph workspace, a graph processing algorithm operating on the heterogeneous graph.

Example 12: The method of Example 11, further comprising: validating the workspace definition to determine whether the workspace definition satisfy one or more conditions.

Example 13: The method of Example 12, wherein the one or more conditions include a verification that vertex attributes defined to have a same name share a same datatype across different vertex tables, and wherein the one or more conditions further include a verification that edge attributes defined to have a same name share a same datatype across different edge tables.

Example 14: The method of any one of Examples 12 to 13, wherein the one or more conditions includes a verification that the workspace definition defines, for an edge table including a plurality of source vertices and a plurality of destination vertices, a first vertex table including the plurality of source vertices and a second vertex table including the plurality of destination vertices.

Example 15: The method of Example 14, wherein the first vertex table and the second vertex table are a same table or different tables within the heterogeneous graph.

Example 16: The method of any one of Examples 12 to 15, wherein the one or more conditions include a verification that the label associated with each table of the plurality of vertex tables and/or edge tables are unique within the graph workspace.

Example 17: The method of any one of Examples 12 to 16, wherein the one or more conditions include a verification that a creator of the graph workspace has a CREATE ANY privilege for the graph workspace and a SELECT privilege for the plurality of vertex tables and/or edge tables.

Example 18: The method of any one of Examples 11 to 17, wherein the label for each table of the plurality of vertex tables and/or edge tables is explicitly defined or defaults to a corresponding table name.

Example 19: The method of any one of Examples 11 to 18, wherein the heterogeneous graph includes a first vertex table including a first plurality of vertices representative of a first plurality of entities, a second vertex table including a second plurality of vertices representative of a second plurality of entities, and at least one edge table including a plurality of edges representative of a plurality of relationships amongst the first plurality of entities and/or the second plurality of entities.

Example 20: A non-transitory computer readable medium storing instructions, which when executed by at least one data processor, result in operations comprising: receiving a workspace definition defining a graph workspace for a heterogeneous graph having a plurality of vertex tables and/or edge tables; upon validating the workspace definition, creating the graph workspace for the heterogeneous graph in accordance with the workspace definition, the graph workspace including a label for each table of the plurality of vertex tables and/or edge tables comprising the heterogeneous graph, and each vertex and edge of the heterogeneous graph being uniquely identified based on a label of a corresponding table and one or more key attributes; and executing, based at least on the graph workspace, a graph processing algorithm operating on the heterogeneous graph.

Figure 5:
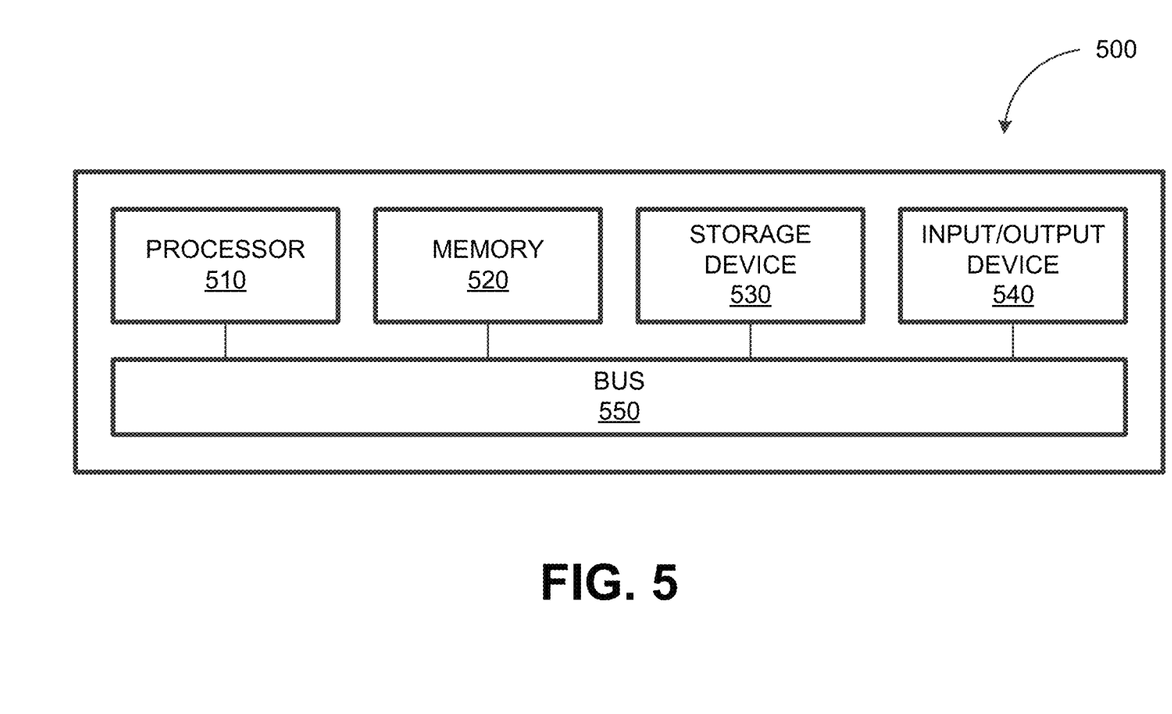
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 can be used to implement the database management system 110 and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      receiving a workspace definition defining a graph workspace for a heterogeneous graph having a plurality of vertex tables and one or more edge tables;
      validating the workspace definition to determine whether the workspace definition satisfies one or more conditions, wherein the one or more conditions include a verification that vertex attributes defined to have a same name share a same datatype across different vertex tables and that edge attributes defined to have a same name share a same datatype across different edge tables, and wherein the one or more conditions further include that a datatype and an order of a plurality of source vertex attributes and target vertex attributes of each edge table of the one or more edge tables match a datatype and an order of a plurality of key attributes in corresponding vertex tables;
      upon validating the workspace definition, creating the graph workspace for the heterogeneous graph in accordance with the workspace definition, the graph workspace including a label for each table of the plurality of vertex tables and the one or more edge tables comprising the heterogeneous graph, and each vertex and edge of the heterogeneous graph being uniquely identified based on a label of a corresponding table and one or more key attributes; and
      executing, based at least on the graph workspace, a graph processing algorithm operating on the heterogeneous graph.

2. The system of claim 1, wherein the operations further comprise triggering a revalidation of the workspace definition defining the graph workspace when one or more of the plurality of vertex tables or the one or more edge tables are altered by an addition or a removal of a column.

3. The system of claim 1, wherein the one or more conditions further include a verification that the workspace definition defines, for an edge table including a plurality of source vertices and a plurality of destination vertices, a first vertex table including the plurality of source vertices and a second vertex table including the plurality of destination vertices.

4. The system of claim 1, wherein the first vertex table and the second vertex table are a same table or different tables within the heterogeneous graph.

5. The system of claim 1, wherein the one or more conditions further include a verification that the label associated with each table of the plurality of vertex tables and the one or more edge tables is unique within the graph workspace.

6. The system of claim 1, wherein the one or more conditions further include a verification that a creator of the graph workspace has a CREATE ANY privilege for the graph workspace and a SELECT privilege for the plurality of vertex tables and the one or more edge tables.

7. The system of claim 1, wherein the label for each table of the plurality of vertex tables and the one or more edge tables is explicitly defined or defaults to a corresponding table name, and wherein the graph workspace models the heterogeneous graph by maintaining each vertex table of the plurality of vertex tables separately and by maintaining each edge table of the one or more edge tables separately.

8. The system of claim 1, wherein the heterogeneous graph includes a first vertex table including a first plurality of vertices representative of a first plurality of entities, a second vertex table including a second plurality of vertices representative of a second plurality of entities, and at least one edge table including a plurality of edges representative of a plurality of relationships amongst the first plurality of entities and the second plurality of entities.

9. The system of claim 1, wherein the graph processing algorithm includes one or more graph processing functions including subgraph, inverse graph, in-degree, out-degree, incoming edges, outgoing edges, neighbors, is-reachable, shortest path, shortest path one to all, k shortest paths, strongly connected components, depth first traversal, and breadth first traversal.

10. A computer-implemented method, comprising:
receiving a workspace definition defining a graph workspace for a heterogeneous graph having a plurality of vertex tables and one or more edge tables;
validating the workspace definition to determine whether the workspace definition satisfies one or more conditions, wherein the one or more conditions include a verification that vertex attributes defined to have a same name share a same datatype across different vertex tables and that edge attributes defined to have a same name share a same datatype across different edge tables, and wherein the one or more conditions further include that a datatype and an order of a plurality of source vertex attributes and target vertex attributes of each edge table of the one or more edge tables match a datatype and an order of a plurality of key attributes in corresponding vertex tables;
upon validating the workspace definition, creating the graph workspace for the heterogeneous graph in accordance with the workspace definition, the graph workspace including a label for each table of the plurality of vertex tables and the one or more edge tables comprising the heterogeneous graph, and each vertex and edge of the heterogeneous graph being uniquely identified based on a label of a corresponding table and one or more key attributes; and
executing, based at least on the graph workspace, a graph processing algorithm operating on the heterogeneous graph.

11. The method of claim 10, further comprising triggering a revalidation of the workspace definition defining the graph workspace when one or more of the plurality of vertex tables or the one or more edge tables are altered by an addition or a removal of a column.

12. The method of claim 10, wherein the one or more conditions further include a verification that the workspace definition defines, for an edge table including a plurality of source vertices and a plurality of destination vertices, a first vertex table including the plurality of source vertices and a second vertex table including the plurality of destination vertices.

13. The method of claim 10, wherein the first vertex table and the second vertex table are a same table or different tables within the heterogeneous graph.

14. The method of claim 10, wherein one or more conditions further include a verification that the label associated with each table of the plurality of vertex tables and the one or more edge tables is unique within the graph workspace.

15. The method of claim 10, wherein the one or more conditions further include a verification that a creator of the graph workspace has a CREATE ANY privilege for the graph workspace and a SELECT privilege for the plurality of vertex tables and the one or more edge tables.

16. The method of claim 10, wherein the label for each table of the plurality of vertex tables and the one or more edge tables is explicitly defined or defaults to corresponding table name, and wherein the graph workspace models the heterogeneous graph by maintaining each vertex table of the plurality of vertex tables separately and by maintaining each edge table of the one or more edge tables separately.

17. The method of claim 10, wherein the heterogeneous graph includes a first vertex table including a first plurality of vertices representative of a first plurality of entities, a second vertex table including a second plurality of vertices representative of a second plurality of entities, and at least one edge table including a plurality of edges representative of a plurality of relationships amongst the first plurality of entities and the second plurality of entities.

18. A non-transitory computer readable medium storing instructions, which when executed by at least one data processor, result in operations comprising:
receiving a workspace definition defining a graph workspace for a heterogeneous graph having a plurality of vertex tables and one or more edge tables;
validating the workspace definition to determine whether the workspace definition satisfies one or more conditions, wherein the one or more conditions include a verification that vertex attributes defined to have a same name share a same datatype across different vertex tables and that edge attributes defined to have a same name share a same datatype across different edge tables, and wherein the one or more conditions further include that a datatype and an order of a plurality of source vertex attributes and target vertex attributes of each edge table of the one or more edge tables match a datatype and an order of a plurality of key attributes in corresponding vertex tables;
upon validating the workspace definition, creating the graph workspace for the heterogeneous graph in accordance with the workspace definition, the graph workspace including a label for each table of the plurality of vertex tables and the one or more edge tables comprising the heterogeneous graph, and each vertex and edge of the heterogeneous graph being uniquely identified based on a label of a corresponding table and one or more key attributes; and executing, based at least on the graph workspace, a graph processing algorithm operating on the heterogeneous graph.

\* \* \* \* \*